United States Patent [19]

Mason et al.

[11] Patent Number: 5,414,051

[45] Date of Patent: * May 9, 1995

[54] NYLON COMPOSITIONS FEATURING IMPROVED RATES OF CRYSTALLIZATION AND METHODS FOR FORMING THE SAME

[75] Inventors: Charles D. Mason, Chatham Township, Morris County; Nicolas Vanderkooi, Jr., Pompton Plains, both of N.J.

[73] Assignee: AlliedSignal Inc., Morris Township, Morris County, N.J.

[ * ] Notice: The portion of the term of this patent subsequent to Oct. 25, 2011, has been disclaimed.

[21] Appl. No.: 214,055

[22] Filed: Mar. 14, 1994

Related U.S. Application Data

[63] Continuation of Ser. No. 77,156, Jun. 14, 1993, abandoned, which is a continuation of Ser. No. 656,377, Feb. 19, 1991, abandoned.

[51] Int. Cl.⁶ .................................... C08L 77/00
[52] U.S. Cl. ................................ 525/432; 525/420
[58] Field of Search .................................. 525/432

[56] References Cited

U.S. PATENT DOCUMENTS

| | | | |
|---|---|---|---|
| 2,698,966 | 1/1955 | Stott et al. | 525/432 |
| 3,549,651 | 12/1970 | Oswald et al. | 260/30.6 |
| 4,749,736 | 6/1988 | Khanna et al. | 524/230 |

FOREIGN PATENT DOCUMENTS

| | | | |
|---|---|---|---|
| 850986 | 10/1960 | United Kingdom | 525/432 |

OTHER PUBLICATIONS

Nylon Plastics, pp. 424–425, M. I. Kohan, John Wiley & Sons, Pub., (1973).

*Primary Examiner*—Ana L. Carrillo
*Attorney, Agent, or Firm*—Michele G. Mangini; Roger H. Criss; Ernest D. Buff

[57] ABSTRACT

Disclosed are compositions and process for the improving the rate or crystallization of polyamide containing compositions which comprise two polyamides having dissimilar melting temperatures, said process comprising the steps of heating the two polyamides to a temperature which is above the melting point of the polyamide having the lower melting temperature but below the melting temperature of the polyamide having the higher melting temperature, as well compositions made in accordance with the process. Preferred polyamides include polycaprolactam and polyhexamethylene adipamide, poly(tetramethylenediamine-co-adipic acid) and further, the inventive compositions may optionally include optional additional constituents. The process provided for improved nucleation without the necessity of inorganic nucleation promoters or agents, and articles made in accordance to the process exhibit good physical properties.

23 Claims, 2 Drawing Sheets

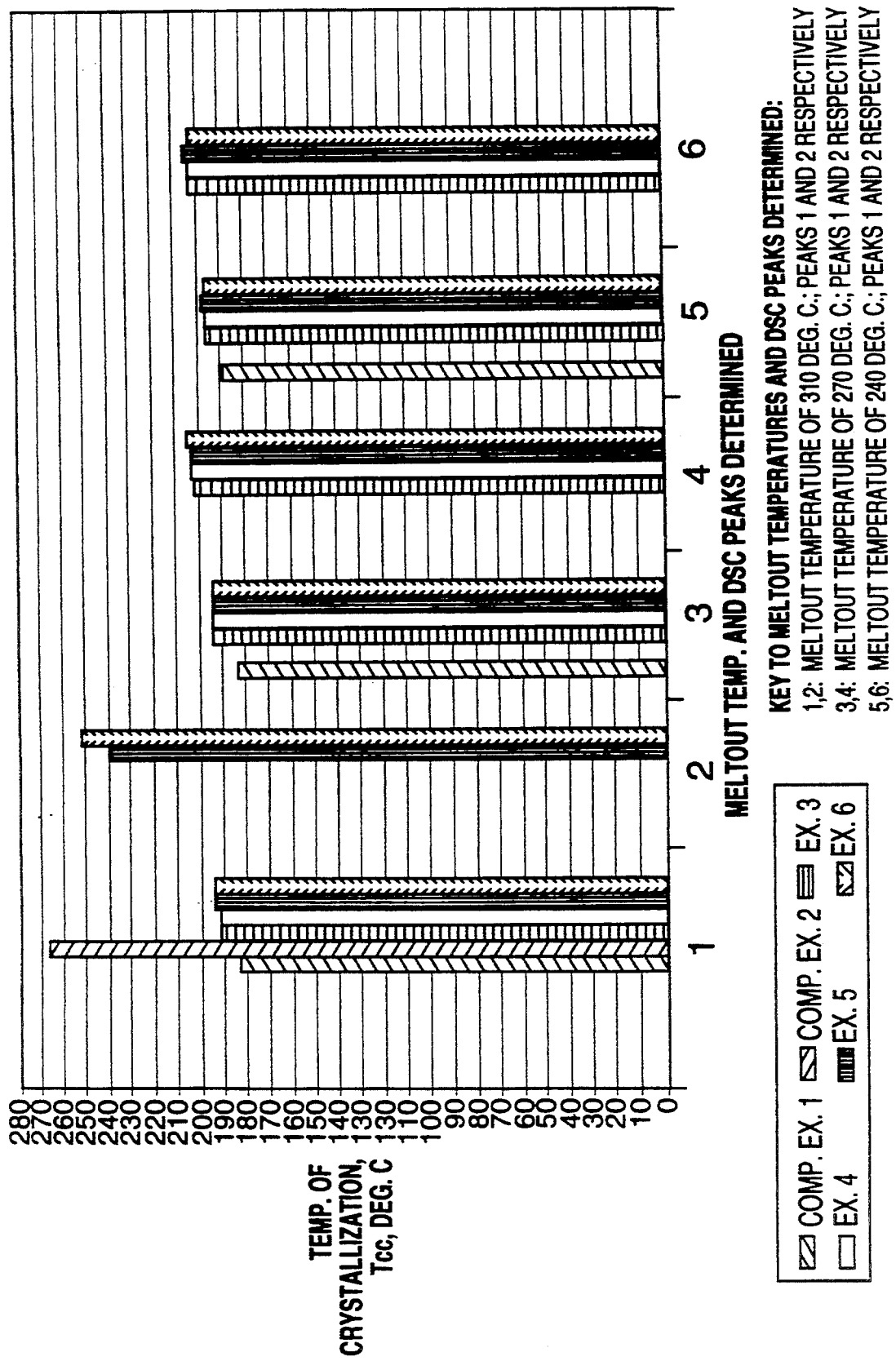

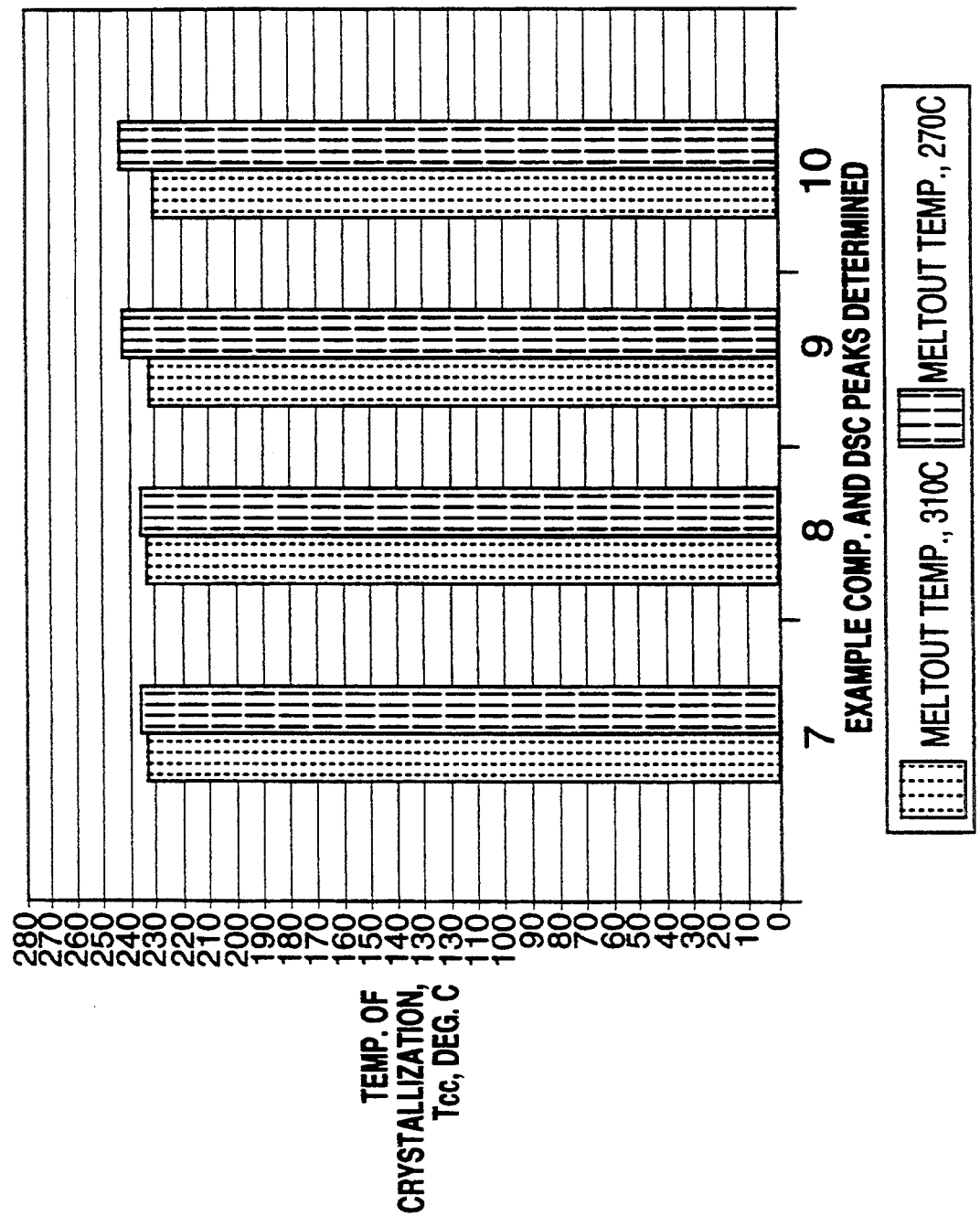

NYLON COMPOSITIONS FEATURING IMPROVED RATES OF CRYSTALLIZATION AND METHODS FOR FORMING THE SAME

This application is a continuation of application Ser. No. 08/077,156, filed Jun. 14, 1993, now abandoned, which is a continuation of application Ser. No. 656,377, filed Feb. 19, 1991, now abandoned.

BACKGROUND

1. Field of the Invention

The invention relates to compositions of polymeric materials comprising polyamides; more particularly the present invention relates to compositions comprising two polyamides wherein the composition features improved crystallization rates. The invention also relates to methods for forming such compositions of polymeric materials.

2. Description of the Prior Art

As is well known to the art, thermoplastic polymeric materials which feature a high degree of crystallinity in the final formed article are highly desirable. Such highly crystalline polymeric materials exhibit improvements in several key properties, including resistance to mold shrinkage, heat distortion temperature, maximum dimensional stability and resistance to deformation, hardness, abrasion resistance, tensile yield strength and surface hardness.

To induce or to improve the rate of crystalline formation of a polymer from its amorphous state, typically its molten state which exists during the processing of the polymer and prior to its final molding, casting or shaping step, it is known in the art to use a variety of nucleating agents or other crystalline promoters. Examples of such crystalline promoters include those described in *Nylon Plastics*, M. I. Kohen, J. Wiley & Sons, New York (1973), at p. 424.

Known crystallization promoters for polyamides include finely divided particulates such as those described in U.S. Pat. No. 3,549,651 to Oswald et al. wherein the use of finely divided agents selected from a select group used in conjunction with a plasticizing agent are used in minor amounts relative to the quantity of the polyamide. Other crystallization promoting additives include the system described in U.S. Pat. No. 4,749,736 to Khanna et al. wherein are discussed polyamide compositions which comprise nucleating agents including finely divided inorganic materials, one or more low molecular weight polymers, and one or more fatty acid amides. Further crystallization promoters known to the art include those described in U.S. Pat. 3,645,932 wherein are disclosed a group of nucleating agents selected from: polymers and copolymers of monoolefins having of 2–6 carbon atoms the ionomer of ethylene acrylic acid copolymer, a polyamide of ε-caprolactam, a polyamide of ω-amino undecanoic acid, a polyamide of ω-aminododecanoic acid, a polyamide of hexamethylene diamine and adipic acid, a polyamide of hexamethylene diamine and sebasic acid, or a copolyamide resin derived from polymeric fatty acids, sebasic acid and bis-amino-ethylbenzene, polycarbonate of p,p-1-isopropyliodenediacrylonitrile, butadiene and styrene, natural rubber, balata and paraffin wax, which are dispersed in the polymeric material.

While these nucleation promoters provide beneficial improvements to the compositions within which they may be incorporated there is a continuing need in the art for improved nucleation promoters which are chemically compatible and which enhance nucleation of the compositions of which they form a part.

SUMMARY

In accordance with the teaching of the present invention there is provided a polyamide containing composition comprising two polyamides, which polyamide containing composition is formed by a process which includes the process step of:

heating the two polyamides to a temperature which is above the melting point of the polyamide having the lower melting temperature but below the melting temperature of the polyamide having the higher melting temperature, with the further proviso that at no time during the process is the temperature of the composition comprising the two polyamides raised to or above the melting temperature of the polyamide having the higher melting temperature so to completely melt the the polyamide having the higher melting temperature.

A still further aspect of the invention is a process for increasing the rate of crystallization of polyamide containing compositions which includes the process steps of:

adding a second polyamide to the composition;

heating the two polyamides to a temperature which is above the melting point of the polyamide having the lower melting temperature but below the melting temperature of the polyamide having the higher melting temperature, with the further proviso that at no time during the process is the temperature of the composition comprising the two polyamides raised to or above the melting temperature of the polyamide having the higher melting temperature so to completely melt the polyamide having the higher melting temperature.

A further aspect of the invention is a process for increasing the rate of production of articles formed from a molding material comprising two polyamides.

A still further aspect of the invention is a process for improving the rate of crystallinity for formed articles which comprises the process steps of:

providing a molding composition comprising two polyamides, and, heating the two polyamides to a temperature which is above the melting point of the polyamide having the lower melting temperature but below the melting temperature of the polyamide having the higher melting temperature, with the further proviso that at no time during the process is the temperature of the composition comprising the two polyamides raised to or above the melting temperature of the polyamide having the higher melting temperature.

Advantageous effects of the instant invention include the improved rate of production and decreased processing times which are now possible consequent to improved rates of crystallization of such polyamide containing compositions.

BRIEF DESCRIPTION OF THE DRAWINGS

FIG. 1 depicts the determined temperature of crystallization at various melt temperatures for several compositions in accordance with the invention.

FIG. 2 depicts the evaluated temperature of crystallization at various melt temperatures for several compositions in accordance with the present invention's teachings.

DESCRIPTION OF THE PREFERRED EMBODIMENTS

Polyamides which find use in accordance with the present invention include those which may be obtained by the polymerization of equimolar proportions of a diamine having two or more carbon atoms between the amine terminal groups with a dicarboxylic acid, or alternately that obtained by the polymerization of a monoamino carboxylic acid or an internal lactam thereof with an equimolar proportion of a diamine and a dicarboxylic acid. Further, suitable polyamides may be derived by the condensation of a monoaminocarboxylic acid or an internal lactam thereof having at least two carbon atoms between the amino and the carboxylic acid groups, as well as other means. General procedures useful for the preparation of polyamides are well known to the art, and the details of their formation is well described under the heading "Polyamides" in the Encyclopedia of Polymer Science and Technology, published by John Wiley & Sons, Inc, Vol. 10, pps.487–491, (1969).

Suitable diamines include those having the formula

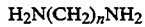

$$H_2N(CH_2)_nNH_2$$

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4-trimethylpentamethylenediamine, as well as cycloaliphatic diamines, such as diaminodicyclohexylmethane, and other compounds. The dicarboxylic acids useful in the formation of polyamides are preferably those which are represented by the general formula

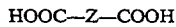

HOOC—Z—COOH wherein Z is representative of a divalent aliphatic radical containing at least 2 carbon atoms, such as adipic acid, sebacic acid, octadecanedioic acid, pimelic acid, subeic acid, azelaic acid, undecanedioic acid, and glutaric acid. The dicarboxylic acids may be aliphatic acids, or aromatic acids, such as isophtalic acid and terephthalic acid.

By means of example, suitable polyamides include: polypropiolactam (nylon 3), polypyrrolidone (nylon 4), polycaprolactam (nylon 6), polyheptolactam (nylon 7), polycaprylactam (nylon 8), polynonanolactam (nylon 9), polyundecaneolactam (nylon 11), polydodecanolactam (nylon 12), poly(tetramethylenediamine-co-oxalic acid) (nylon 4,2), poly(tetramethylenediamine-co-adipic acid) (nylon 4,6), poly(tetramethylenediamine-co-isophthalic acid) (nylon 4,I), polyhexamethylenediamine adipamide (nylon 6,6), polyhexamethylene azelaiamide (nylon 6,9), polyhexamethylene sebacamide (nylon 6,10), polyhexamethylene isophthalamide (nylon 6,I), polyhexamethylene terephthalamide (nylon 6,T), polymetaxylylene adipamide (nylon MSD:6), poly(hexamethylenediamine-co-dodecanedioic acid) (nylon 6,12), poly(dodecamethylenediamine-co-dodecanedioic acid) (nylon 12,12), poly(bis[4-aminocyclohexyl]methane-co-dodecanedioic acid) (PACM-12), as well as copolymers of the above polyamides. By way of illustration and not limitation, such polyamide copolymers include: hexamethylene adipamide-caprolactam (nylon 6,6/6), hexamethylene adipamide/hexamethylene-isophthalamide (nylon 6,6/6IP), hexamethylene adipamide/hexamethylene-terephthalamide (nylon 6,6/6T), trimethylene adipamide-hexamethyleneazelaiamide (nylon trimethyl 6,2/6,2), and hexamethylene adipamide-hexamethylene-azelaiamide caprolactam (nylon 6,6/6,9/6) as well as others polyamide copolymers which are not particularly delineated here.

It has been discovered that the use of an effective amount of a second polyamide may be used as an effective crystallization promoter for a composition which comprises a first polyamide, wherein the second polyamide has a melt temperature higher than the melt temperature of the first polyamide in the composition.

According to the invention, an effective amount of a second polyamide which has a melting point higher than a first polyamide is intimately contacted with the first polyamide to form a polyamide composition which is subsequently subjected to a heating process which includes the process step of heating the polyamide composition to a composition melt temperature which is above the melting point of the first polyamide but below the melting temperature of the second polyamide with the further proviso that at no time during the process is the temperature of the composition comprising the two polyamides raised to or above the melting temperature of the second polyamide.

A further surprising feature of the present invention is that it has been found is that the second polyamide need not be present in large amounts relative to the total composition, and may comprise only a relatively small fraction of the total composition. It has been found that the beneficial effect of improved crystallinity has been achieved when the relative ratios of the weight percentages of the second polyamide to the first polyamide is 40%:60%, or 20%:80%, and may be even less; significant increases have been noted even where the ratio of the second polyamide to the first polyamide is 5%:95%. Such an effect has been observed for blends of nylon 4,6 and nylon 6,6 as well as for blends of nylon 6 and nylon 4,6; it is further hypothesized that the similarity of the crystallization characteristics of nylons, particularly as has already been seen for blends of nylon 6 and nylon 4,6 and blends of nylon 4,6 and nylon 6,6, will allow for the practice of other compositions which comprise different polyamides to be used and to enjoy the benefit of an improvement in the temperature of crystallization (Tcc) and consequent more rapid crystallization of the composition from the melt.

Optionally, the heating process may include the further process step of maintaining the temperature of the polyamide composition at or about the composition melt temperature for a melt time interval. The length of this melt time interval may be any period of time found within which the teaching of the present invention is found to be effective, and it is contemplated and most preferred that the melt time interval be the residence time of the composition in a screw extruder, although the residence time of the inventive compositions in other apparati useful in containing and/or processing a melt of the constituents form alternate preferred embodiments. It should be apparent to those skilled in the art that the composition melt temperature, and the optional time of the melt time interval herein described are subject to variation and are to be determined through experimental evaluation as it is recognized that the heating rate and process within which the instant invention may be used is in great measure a function of the type of process and apparatus with which the instant invention is practiced. Specific times are described with reference to particular process conditions in the examples to be discussed below, however it should be recognized that such particular times are by way of illustration, and not by way of limitation and that other process times and process conditions suited to a particular process not described here may be used. The compositions of the present invention may further comprise conventional polymer additives well-known to the art, including fillers, reinforcing agents, stabilizers, dyes, flame retarding agents, mold-release agents, plasticizers, pigments, ultraviolet light absorption agents, antistatic agents, lubricants, and the like which may be added in effective amounts and which do not deleteriously affect upon the working of the instant invention. While the present invention provides compositions which feature excellent crystallization properties, the use of a nucleating agent, while not necessary, may also be included if desired.

The mixing of a composition containing the first and second polyamide may be effected in any manner known to the art which is known to provide this effect. By way of example and not by way of limitation, suitable methods include thorough blending of the two polyamides, as well as other optional constituents in a mixer, blender, mill or the like, but is preferably achieved by providing the constituents of a composition which include the two polyamides as well as other optional constituents to an extruder, either of the single screw type, or of a plural screw type one example of which is a dual screw type extruder, and extruding the blended constituents. The extrudate so formed may be used to either form a final article or may be used to form a particulate feedstock, i.e. pellets, powders, prills or the like for use in a subsequent molding, pressing or casting operation.

The determination of the crystalline behavior of the polyamide compositions in accordance with the present invention's teachings may be by any known method now known to the art, or which may be developed in the future and which will operate in a satisfactory manner. By way of example, these include: Differential Scanning Calorimetry techniques and their related apparatus, Differential Thermal Analysis techniques and their related apparatus, and in some cases, Depolarized Light Intensity Techniques and their related apparatus. These apparati are known to the art and their application are discussed in U.S. Pat. Nos. 3,367,926 and 4,749,736 whose discussions are incorporated herein by reference. The analytical technique of Differential Scanning Calorimetry is also discussed under the heading of "Crystallinity Determination—Thermal Analysis" in "Encyclopedia of Polymer Science and Engineering" 2nd. Ed., H. Mark, Ed. published by John Wiley & Sons, New York, 1986, Vol.4, at p. 488. Of these methods, the preferred method is Differential Scanning Calorimetry, or "DSC", with a suitable commercially available apparatus which performs an automated testing protocol available from the Perkin Elmer Co., as the Perkin Elmer DSC-2C system. This Perkin Elmer DSC-2C was used in the determinations in the example compositions which are set forth below.

It should be evident that compositions according to the invention do not require the use of nucleating agents, such as typically used inorganic materials, and it is known that such typical nucleating agents if used in high enough amounts, may have a deleterious effect upon the mechanical properties of molding compositions as such inorganic materials are usually chemically incompatible with the polyamides of the molding composition. In contrast, the compositions according to the present invention's teaching provide benefits which include improved crystallization rates between the polyamide which may form the bulk of the molding composition, and the polyamide which acts as a nucleating agent. Also, while not distinctly evidenced by any quantitative data, it is also contemplated tha the compositions of the instant invention and compositions according to the invention used for producing them may comprise improved partial or limited compatibilization between the polyamides, although the successful practice of the invention is not contingent upon any requirement of compatibility between the polyamides used in formulating or producing a composition.

Compositions of polymeric materials produced according to the instant invention find utility in forming molded articles, molded profiles and films by methods well known to the art, including extrusion molding and injection molding.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

Comparative Example 1

A composition comprising 100 parts by weight of a nylon 6 polyamide described as having the following physical properties: a formic acid viscosity of 70, a number average molecular weight of 22,500 and having approximately 50 mole percent of amine groups as end groups and approximately 50 mole percent of carboxylic acid groups as end groups, was provided to a 1 inch Wayne single screw extruder having a standard general purpose screw and a length-to-diameter (L/D) ratio of 25, and a compression ratio 3:1 and further equipped with a 3 inch Maddox mixing section, which was operated at the following temperature profile across the length of the extruder: zones 1–4 at temperatures of between 288 and 292 deg.C., die temperature 292 deg.C. While these temperatures were established as operating conditions, it will be appreciated by the skilled practitioner that internal mixing effects of the extruding operation imparts internal forces upon the composition, including shear effects, which effects act to increase the temperature of a molding composition. In this example, a pyrometer was used to determine the temperature of the composition in the extruder barrel and a temperature of 310 deg.C. was determined. The throughput of the extrudate was between 6–7 lbs./hr, with the average residence time of the constituents was approximately 120 seconds. The extrudate was formed into strands which were cooled by drawing through a water bath and which were subsequently chopped into pellets suitable for later use as feedstock for an injection molding operation for forming articles.

Samples of the extrudate formed were analyzed using a Differential Scanning Calorimeter, the Perkin Elmer DSC-2C automated system described above. Each sample was crimped in an aluminum cup, heated to a test temperature to form at least a partial melt of the composition at a programmed rate of 10 deg.C. per minute, held there for 30 seconds, and then cooled at a rate of 10 deg.C. per minute to determine the crystallization temperature, "Tcc". For each sample, the peak provided by the system was indicative of the Tcc determined.

A first sample was processed in accordance with the above described protocol and heated to a test temperature of 310 deg.C.; the resultant peak indicated a crystallization temperature of 183 deg.C. Subsequently, a second sample was processed in accordance with the above described protocol to a test temperature of 270 deg.C.; the resultant peak provided by the DSC indicated a crystallization temperature of 184 deg.C. Afterwards, the test was again repeated, and a third sample was tested in accordance with the described protocol and heated to a test temperature of 240 deg.C. and analyzed by the DSC. The results indicated a peak at 184 deg.C. Results of the DSC testing are set forth on Table 1 and further illustrated on FIG. 1 which depicts the various Tcc determined for each of the compositions of the Examples and Comparative Examples.

TABLE 1

| Example | Nylon 6 | Nylon 4,6 | Tcc (310 deg. C.) | Tcc (270 deg. C.) | Tcc (240 deg. C.) |
|---|---|---|---|---|---|
| 1 | 100 | 0 | 183 | 184 | 188 |
| 2 | 0 | 100 | 266 | — | — |
| 3 | 95 | 5 | 192 | 194,203 (1:2) | 196,204 (1:1) |
| 4 | 90 | 10 | 192 | 195,204 (1:2) | 196,204 (1:1) |
| 5 | 80 | 20 | 193,240 (1:1) | 195,204 (1:1) | 198,205 (1:2) |
| 6 | 60 | 40 | 193,251 (1:1) | 195,205 (1:1) | 196,204 (1:2) |

It is to be understood that this composition is for means of comparison, and does not form part of the invention.

Comparative Example 2

A composition of 100 parts by weight of a general-purpose grade unfilled nylon 4,6 homopolymer was melted and extruded in the manner described in comparative Example 1 above and the extrudate was analyzed using the DSC. One sample was evaluated by crimping it in an aluminum cup, heating to a test temperature of 310 deg.C. at a programmed rate of 10 deg.C. per minute, held there for 30 seconds, and then cooled at a rate of 10 deg.C. per minute to determine the crystallization temperature, "Tcc". The analysis by the DSC revealed a peak which indicated a crystallization temperature of 266 deg.C. Results of the DSC testing are set forth on Table 1 and also illustrated in FIG. 1.

It is to be understood that this composition is for means of comparison, and does not form part of the invention.

Example 3

A composition comprising 95 parts by weight of the nylon 6 of Comparative Example 1 and 5 parts by weight of the nylon 4,6 of Example 2 were both provided to the hopper of the 1 inch Wayne single screw extruder and processed generally in accordance with the operating conditions more particularly described in the description of Comparative Example 1 noted above in order to form an extrudate which was formed into strands and subsequently chopped into pellets suitable for later use as feedstock for an injection molding operation for forming articles.

Three samples of the extrudate formed were analyzed using the DSC described in Comparative Example 1, namely the Perkin Elmer DSC-2C automated system in accordance with the protocol discussed above.

A first sample was heated to a test temperature of 310 deg.C.; analysis by the DSC indicated a Tcc at 192 deg.C. which was an increase in the Tcc of 9 deg.C. as compared with the Tcc of non-modified LSM.

A second sample was heated to a test temperature of 270 deg.C.; two resultant peaks were determined, one at 194 deg.C. and another at 203 deg.C. Further, the ratio of the integral of areas under these respective peaks was in the ratio of approximately 1:2 for the first and second peak respectively and is indicated on Table 1 in parenthesis following the Tcc determined under the test condition.

Subsequently, a third sample was processed in accordance with the above described protocol to a different test temperature of 240 deg.C.; the resultant graph provided by the Perkin Elmer DSC-2C indicated two peaks, one at a the temperature of 196 deg.C. which approximates that determined for the first sample, and a second peak at the temperature of 204 deg.C. Further, the ratio of the integral of areas under these respective peaks was in the ratio of approximately 1:1 for the first and second peak respectively.

Surprisingly, the development of this second peak as the samples cooled from respective temperatures of 270 and 240 deg.C., even with the relatively small amount of the nylon 4,6 included in the composition is indicative of faster crystallization of the total composition from the melt; it should be appreciated by one skilled in the art that the onset of crystallization from the melt occurs at the higher temperature of the two peaks with a consequent overall improvement in the rate of crystallization of the total composition.

Results of the DSC testing are set forth on Table 1, as well as FIG. 1 which illustrates the Tcc results of the Perkin Elmer DSC-2C for each exemplary composition.

Example 4

In accordance with the invention, a composition comprised 90 parts by weight of the nylon 6 homopolymer previously described in Comparative Example 1 and 10 parts by weight of the nylon 4,6 previously described in Example 2 was combined and provided to the Wayne 1 inch extruder and processed in accordance with the apparatus and procedure used to form the composition of Comparative Example 5 to form pellets suitable for later use as feedstock for an injection molding operation for forming articles.

Three samples of the extrudate formed were analyzed using the DSC described in Comparative Example 1, with the protocol also discussed therein; a single peak was determined when the samples cooled from a melt temperature (test temperature) of 310 deg.C. and the DSC indicated a Tcc of 192 deg.C., a raise of 9 deg.C. as compared to a Tcc of 183 deg.C. of unmodified LSM (as of Comparative Example 1). Two peaks were determined from each of further test temperatures of 270 deg.C., and 240 deg.C. with respective ratios of the area under each peak indicated on Table 1 in parenthesis correspondentially alongside the respective temperatures at which the peak of each of the Tcc measurements was determined.

It was further found that the ratio of the integral of areas under these respective peaks was approximately 1:2 for the first and second peak respectively as the composition cooled from a test temperature of 270 deg.C., and for the composition cooled from a test temperature of 240 deg.C. the areas under the respective peaks was approximately 1:1; these results are indicated also on FIG. 1.

Example 5

In accordance with the invention, a composition comprised 80 parts by weight of the nylon 6 homopolymer previously described in Comparative Example 1 and 20 parts by weight of the nylon 4,6 also previously described was combined and provided to the Wayne 1 inch extruder and processed generally in accordance with the apparatus and procedure of Comparative Example 1 to form pellets suitable for later use as feedstock for an injection molding operation for forming articles.

Three samples of the extrudate formed were analyzed using the DSC described in Comparative Example 1, with the protocol also discussed therein; two peaks were determined when the samples cooled from a melt temperature (test temperature) of 310 deg.C.; the ratio of the areas under each peak was approximately 1:1 and is indicated with the Tcc on Table 1 as well as illustrated on FIG. 1. Similarly, two peaks were determined from each of test temperatures of 270 deg.C., and 240 deg.C., and it was further found that the ratio of the integral of areas under these respective peaks was approximately 1:1 for the first peak, and 1:2 for the second peak respectively for each of the different test temperatures.

Example 6

Similarly to the composition of Example 5, a composition comprised 60 parts by weight of the nylon 6 homopolymer previously described and 40 parts by weight of the previously described nylon 4,6 was combined, extruded and three samples of the extrudate subsequently evaluated using the DSC. Using the testing protocol used in Example 5, the first sample heated to a test temperature (melt temperature) of 310 deg.C. and evaluated by the DSM indicated two Tcc peaks at 193 deg.C. and 251 deg.C. with the ratio of the areas under each peak approximately 1:1, which is further indicated on Table 1. Similarly for each of the second and third samples, two peaks were determined for each, as well; test results and the respective ratio of the integral of areas under these respective peaks is noted on Table 1.

Comparative Example 7

A composition consisting of 100 parts by weight of the nylon 6 homopolymer previously described was provided to the Wayne 1 inch extruder and processed in accordance with the apparatus and procedure used in the description of Comparative Example 1, except that the barrel of the extruder was heated to only 270 deg.C., to form pellets suitable for later use as feedstock for an injection molding operation for forming articles. Two samples were analyzed using the DSC and the testing protocol described in conjunction with Example 1. The sample heated to a test temperature (melt temperature) of 310 deg.C.; the DSC reported a Tcc corresponding to 232. Similarly, the Tcc reported by the analysis by the DSC from a melt temperature (test temperature) of 270 deg.C. was 236 deg.C. Both resultant Tcc are noted on Table 2 as well as on FIG. 2 which illustrates the interrelationship between the Tcc observed for individual peaks for different meltout temperatures for each of the example compositions listed on Table 2.

It is to be understood that this composition is for means of comparison, and does not form part of the invention.

TABLE 2

| Example | Nylon 6,6 | Nylon 4,6 | Tcc (310 deg. C.) | Tcc (270 deg. C.) |
|---|---|---|---|---|
| 7+ | 100 | 0 | 232 | 236 |
| 8++ | 100 | 0 | 232 | 235 |
| 9++ | 90 | 10 | 231 | 243 |
| 10++ | 80 | 20 | 230 | 244 |

+: melt compounded at 270 deg. C.
++: melt compounded of 310 deg. C.

Comparative Example 8

A composition consisting of 100 parts by weight of the nylon 6 homopolymer previously described was processed and analyzed in the same manner as the composition of Example 6, with the single variation being that the temperature of the extruder was 310 deg.C. Similarly, two samples of the pelletized extrudate were analyzed using the DSC and the testing protocol described in conjunction with Example 1. The sample heated to a test temperature (melt temperature) of 310 deg.C.; the DSC reported a Tcc corresponding to 232. Similarly, the Tcc reported by the analysis by the DSC from a melt temperature (test temperature) of 270 deg.C. was 235 deg.C. Both resultant Tcc are noted on Table 2, as well as being illustrated on FIG. 2.

It is to be understood that this composition is for means of comparison, and does not form part of the invention.

Example 9

In accordance with the invention, a composition comprised 90 parts by weight of the nylon 6 homopolymer and 10 parts by weight of the nylon 4,6 both of which have been previously described. These constituents were provided to the Wayne 1 inch extruder and processed generally in accordance with the apparatus and procedure used to form the composition of Comparative Example 1 with the further proviso that the temperature of the extruder barrel was maintained at approximately 310 deg.C. across all of the heating zones and the die. The extrudate was used to form pellets suitable for later use as feedstock for an injection molding operation for forming articles.

Two samples of the extrudate formed were analyzed using the DSC described above to determine the Tcc from two different test temperatures. The first sample heated to a test temperature (melt temperature) of 310 deg.C. in accordance with the testing protocol indicated a Tcc of 231 deg.C. for the sample. By comparison with the compositions and respective Tcc of Examples 7 and 8, little difference in the Tcc of these samples was noted. Unexpectedly however, the second sample heated to the second and lower test temperature (melt temperature) of 270 deg.C. and subsequently analyzed by the DSC indicated a Tcc of 243 deg.C., seven to eight degrees above the Tcc observed for the compositions of Examples 11 and 12. These test results are indicated on Table 2, as well as on FIG. 2.

Example 10

In a further composition in accordance with the invention, a composition comprised 80 parts by weight of the nylon 6 homopolymer previously described and 20 parts by weight of the nylon 4,6 also previously described. These constituents were provided to the Wayne 1 inch extruder and processed in accordance with the apparatus and procedure used to form the composition of Example 9 described above which included the proviso that the temperature of the extruder barrel was maintained at approximately 310 deg.C. across all of the heating zones and the extruder die. The extrudate was used to form pellets suitable for later use as feedstock for an injection molding operation for forming articles.

Similarly, two samples of the extrudate formed were analyzed using the DSC described above to determine the Tcc from two different test temperatures. The first sample heated to a test temperature (melt temperature) of 310 deg.C. in accordance with the testing protocol indicated a Tcc of 230 deg.C. for the sample which by comparison with the compositions and respective Tcc of Examples 7 and 8, was little changed. Unexpectedly again, the second sample heated to the second and lower test temperature (melt temperature) of 270 deg.C. and subsequently analyzed by the DSC indicated a Tcc of 243 deg.C., seven to eight degrees above the Tcc observed for the compositions of Examples 7 and 8. These test results are indicated on Table 2, and also depicted on FIG. 2.

It will be appreciated that the instant specifications and examples set forth herein are by way of illustration and not limitation, and that various modifications and changes may be made without departing from the spirit and scope of the present invention, whose limitations are bounded only by the appendant claims.

We claim:

1. A process for producing a polyamide molding resin composition suitable for use in extrusion molding and injection molding, comprising at least two polyamides, one of said polyamides comprising poly(tetramethylenediamine-co-adipic acid)(nylon 4,6), which process includes:

heating the polyamide molding resin composition to a temperature which is above the melting point of a first polyamide having the lower melting temperature but below the melting temperature of a second polyamide having the higher melting temperature than the melting temperature of said first polyamide, with the proviso that at no time during the process is the temperature of the composition raised to or above the melting temperature of the polyamide having the higher melting temperature.

2. The process according to claim 1 wherein the composition comprises polycaprolactam (nylon 6).

3. The process according to claim 1 wherein the composition comprises polyhexamethylene adipamide (nylon 6,6).

4. A polyamide molding resin composition comprising two polyamides produced in accordance with the method of claim 1.

5. A polyamide molding resin composition according to claim 4 in the form of a molded article.

6. A polyamide molding resin composition according to claim 4 in the form of a film.

7. A polyamide molding resin composition according to claim 4, which further includes at least one further additive selected from the group consisting of: fillers, reinforcing agents, stabilizers, dyes, flame retarding agents, mold-release agents, plasticizers, pigments, ultraviolet light absorption agents, antistatic agents, and lubricants.

8. A process for increasing the rate of crystallization of a polyamide molding resin composition suitable for use in extrusion molding and injection molding, comprising two polyamides, one of said polyamides comprising poly(tetramethylenediamine-co-adipic acid) (nylon 4,6), which process includes:

heating the molding resin composition to a temperature which is above the melting point of a first polyamide having the lower melting temperature but below the melting temperature of a second polyamide having the higher melting temperature than the melt temperature of said first polyamide and, limiting the temperature of the composition so that at no time during the process is the temperature of the composition raised to or above the melting temperature of the polyamide having the higher melting temperature.

9. The process according to claim 8 wherein the composition comprises polycaprolactam (nylon 6).

10. The process according to claim 8 wherein the composition comprises polyhexamethylene adipamide (nylon 6,6).

11. A polyamide molding resin composition comprising two polyamides produced in accordance with the method of claim 8.

12. A polyamide molding resin composition according to claim 8 in the form of a molded article.

13. A polyamide molding resin composition according to claim 8 in the form of a film.

14. A polyamide molding resin composition according to claim 8, which further includes at least one further additive selected from the group consisting of: fillers, reinforcing agents, stabilizers, dyes, flame retarding agents, mold-release agents, plasticizers, pigments, ultraviolet light absorption agents, antistatic agents, and lubricants.

15. A process for producing a polyamide molding resin composition suitable for use in extrusion molding and injection molding, comprising at least two polyamides, one of said polyamides comprising poly(tetramethylenediamine-co-adipic acid) (nylon 4,6), wherein the composition has a temperature of crystallization which is greater than the temperature of crystallization of the polyamide of its composition which has the lowest temperature of crystallization, which process includes:

heating the polyamide molding resin composition to a temperature which is above the melting point of the polyamide having the lowest melt temperature but below the melting temperature of a second polyamide having the higher melting temperature than the melting temperature of the first polyamide so to melt the polyamide having the lowest temperature of crystallization but insufficiently heating the composition to avoid a complete melt of the second polyamide, with the proviso that at no time during the process is the temperature of the composition raised to or above the melting temperature of the polyamide having the higher melting temperature.

16. A process for producing a polyamide molding resin composition suitable for use in extrusion molding and injection molding, comprising poly(tetramethylenediamine-co-adipic acid) (nylon 4, 6) having a first melting point, and a second polyamide, having a second melting point which is lower than the first melting point, which process includes:

heating the polyamide molding resin composition to a temperature which is above the melting point of the second polyamide but below the melting temperature of the poly(tetramethylenediamine-co-adipic acid) (nylon 4,6) so to melt the second polyamide, while limiting the temperature of the polyamide molding resin composition so that at no time during the process is the temperature of the polyamide molding resin composition raised to or above the melting temperature of the poly(tetramethylenediamine-co-adipic acid) (nylon 4, 6).

17. The process according to claim 16 wherein the composition comprises polycaprolactam (nylon 6).

18. The process according to claim 16 wherein the composition comprises polyhexamethylene adipamide (nylon 6,6).

19. A polyamide molding resin composition comprising two polyamides produced in accordance with the method of claim 16.

20. A polyamide molding resin composition according to claim 16 in the form of a molded article.

21. A polyamide molding resin composition according to claim 16 in the form of a film.

22. A process for preparing a molded article comprising:
(a) forming a composition of two polyamides wherein the melting point of a second polyamide is higher than the melting point of a first polyamide; Serial No. 08/214,055
(b) heating said composition to a temperature which is above the melting point of said first polyamide and below the melting temperature of said second polyamide wherein said heating does not completely melt said second polyamide; and
(c) injection or extrusion molding said composition to form said molded article, with the proviso that at no time during the process is the temperature of the composition raised to or above the melting temperature of the polyamide having the hiker melting temperature.

23. A process for preparing a polyamide molding resin comprising:
(a) forming a composition of two polyamides wherein the melting point of a second polyamide is higher than the melting point of a first polyamide; and
(b) in the absence of an inorganic nucleating agent, heating said composition to a temperature which is above the melting point of said first polyamide and below the melting temperature of said second polyamide wherein said heating does not completely melt said second polyamide, with the proviso that at no time during the process is the temperature of the composition raised to or above the melting temperature of the polyamide having the higher melting temperature.

* * * * *